UNITED STATES PATENT OFFICE.

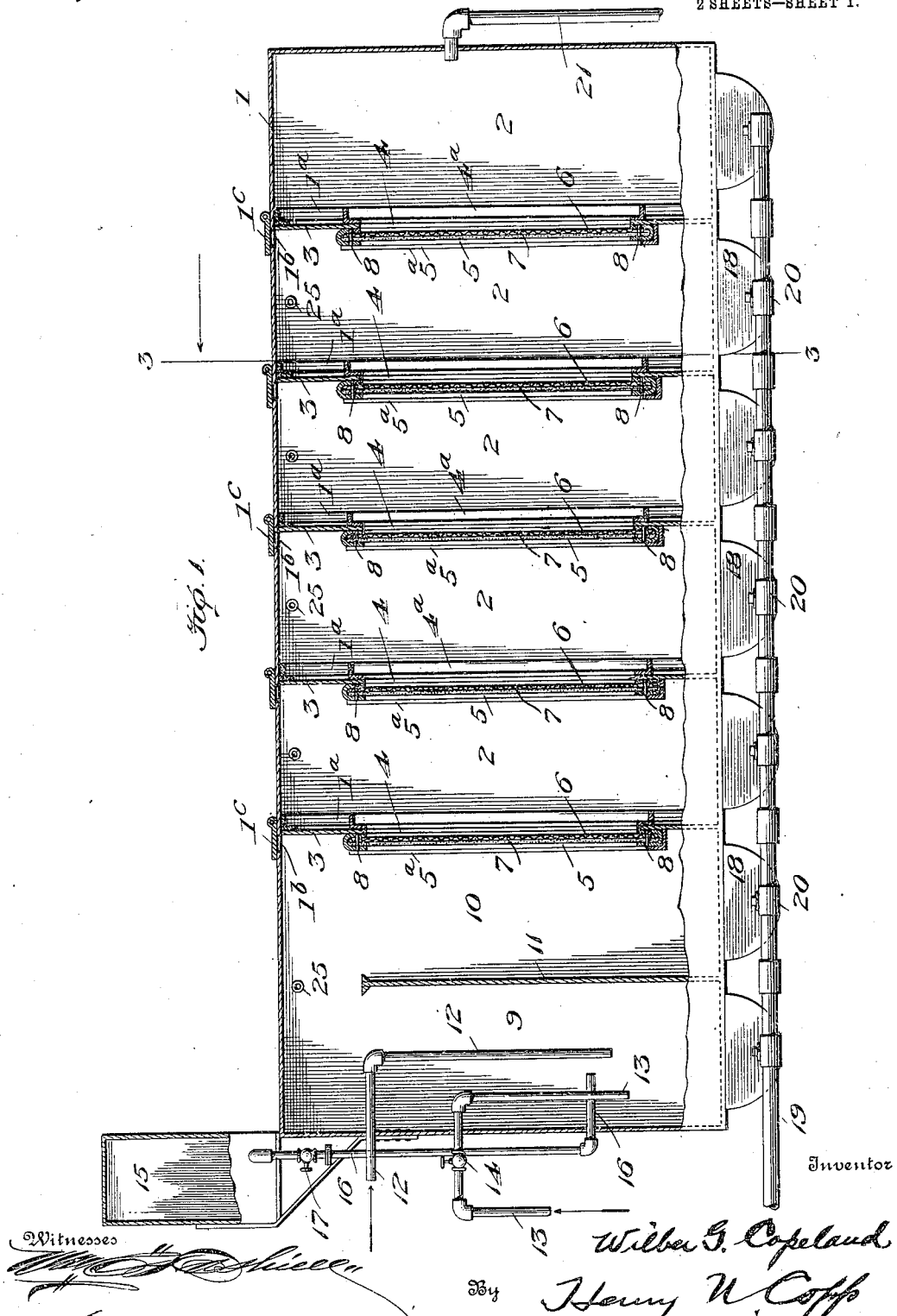

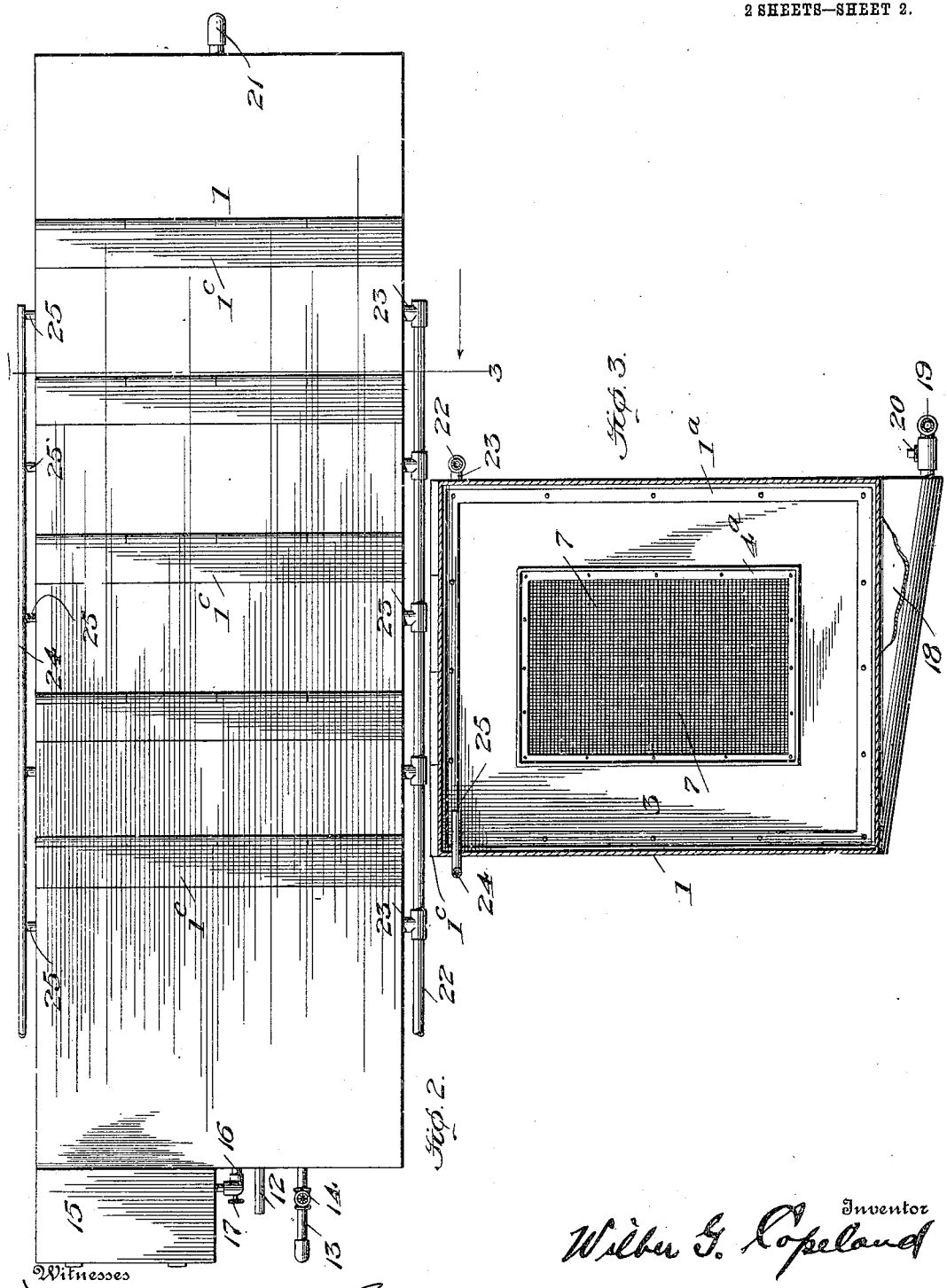

WILBER G. COPELAND, OF PORTLAND, OREGON.

FEED-WATER FILTER AND PURIFIER.

953,377.  Specification of Letters Patent.  Patented Mar. 29, 1910.

Application filed September 1, 1908. Serial No. 451,176.

*To all whom it may concern:*

Be it known that I, WILBER G. COPELAND, a citizen of the United States, residing at Portland, county of Multnomah, and State of Oregon, have invented certain new and useful Improvements in Feed-Water Filters and Purifiers, of which the following is a specification.

This invention relates to feed water filters and purifiers.

The object of the present invention is the provision of a filter and purifier especially adapted for purification of water intended to be used in steam boilers, although not restricted to such use, which will embrace novel means for supplying a precipitating material to the filtering chambers, novel means for catching the material from the water being purified, novel means for agitating and heating the water below its level or surface, and novel means for agitating the surface of the water undergoing purification, novel filtering media, all adapted to efficaciously and readily filter and purify the water and permit rapid and easy flushing of the filter when necessary.

The invention is set forth fully hereinafter and the novel features are recited in the appended claims.

In the accompanying drawings: Figure 1 is a side elevation, principally in section; Fig. 2, a plan view; and Fig. 3, a section on line 3—3 of Figs. 1 and 2.

The shell or casing 1 of the filter and purifier is divided into a number of compartments or chambers 2 which are defined by partitions 3 each having an opening 4 braced by an angle iron framing $4^a$, the partitions being braced and connected to the casing 1 by an angle iron framing $1^a$. Secured to the opposite side of each partition is a channel-iron framing $5^a$ in which is removably seated a frame 5 having a screen 6, and a filtering material 7 of some such suitable fabric as burlap or its equivalent, both riveted to frame 5 by rivets 8. The frames 5 are removable for purposes of repair when necessary. The screens will not require removal as often as the material 7, which requires renewal when it becomes damaged or clogged. The frames 5 are slid vertically in the channel irons $5^a$ and out through openings $1^b$, closed by doors $1^c$ in the top of casing 1 when renewal or cleansing becomes necessary. The rivets 8 are cut when removing the screens or filtering material from their frames 5.

The entrance end of the filter and purifier is divided into two chambers 9 and 10 by a partition 11 which stops considerably short of the top of the casing or shell 1 and over which the water flows from chamber 9 to chamber 10. The water to be filtered enters chamber 9 in the lower part thereof through a pipe 12 and exhaust steam enters through a pipe 13, having a suitable controlling valve 14, by which the water is heated.

There is a hopper or box 15 having suitable means for access to its interior, which is adapted to contain a liquid precipitating compound or chemical, according to the character of the water to be purified and filtered, a pipe 16 leading from this hopper and being adapted to discharge into the lower part of the chamber 9, the feed being controlled by a valve 17. The liquid chemical or compound gives an initial precipitation supplemented by the heat of the exhaust steam, which eliminates the greater part of the foreign matter from the water. Each chamber is provided with a mud drum or sediment collector 18 at its bottom, said collectors being inclined from one end to the other transversely of the entire filter as shown in Fig. 3 so that the sediment will more readily pass out and to this end there is provided a pipe 19 which has valved connections 20 with the respective mud drums The exit pipe is shown at 21.

On one side of the filter near the top thereof is an over-flow pipe 22 having branches 23 connecting with the respective chambers and on the opposite side is a steam pipe 24 having branches 25 connecting with the respective chambers, the relation of the pipes 22, 23, 24, 25, being such that the steam entering the chambers agitates the surface of the water and blows to the overflow pipe the lighter particles of sediment and scale which are then taken through by the over-flow, the heavier particles falling into the mud drums where they are collected and subsequently removed by flushing. The water which finally reaches the outlet pipe 21 is thoroughly purified and filtered.

Having thus described my invention, what I claim as new and desire to secure by Letters Patent is:—

1. In a filter and purifier, the combination with a chamber for the passage of the water, and a filtering medium contained within said filter, of means for introducing steam substantially at the water line for agitating the surface of the water.

2. In a filter and purifier, the combination with a chamber for the passage of the water, and a filtering medium contained within said filter, of means for introducing steam substantially at the water line for agitating the surface of the water and take-off outlets substantially at the water line for removing the particles on the surface of the water.

3. In a filter and purifier, the combination with a chamber, and a filtering medium contained within said filter of means for introducing steam or the like substantially at the surface of the water, in the chamber, and an over-flow and take-off disposed opposite the said means, whereby the particles are blown from the surface of the water and removed.

4. In a filter and purifier, the combination with a chamber having partitions disposed at intervals lengthwise thereof, sub-dividing the said chamber into a plurality of independent compartments, independent filtering media carried by the respective partitions, pipes leading to the respective compartments substantially at the surface of the water for introducing steam or the like, a source of supply for said pipes, and independent take-off pipes disposed opposite the said inlet pipes, whereby the particles are blown from the surface of the water in the respective compartments.

In testimony whereof, I hereunto affix my signature in presence of two witnesses.

WILBER G. COPELAND.

Witnesses:
   THOMAS WITTEYCOMBE,
   J. H. HASKINS.